US010813049B2

(12) United States Patent
Sun et al.

(10) Patent No.: US 10,813,049 B2
(45) Date of Patent: Oct. 20, 2020

(54) COEXISTENCE ENHANCEMENTS FOR WAKE-UP RADIO

(71) Applicant: QUALCOMM Incorporated, San Diego, CA (US)

(72) Inventors: Yanjun Sun, San Diego, CA (US); Alfred Asterjadhi, San Diego, CA (US); Bin Tian, San Diego, CA (US); George Cherian, San Diego, CA (US); Stephen Jay Shellhammer, Ramona, CA (US); Lochan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/905,785

(22) Filed: Feb. 26, 2018

(65) Prior Publication Data

US 2018/0249413 A1    Aug. 30, 2018

Related U.S. Application Data

(60) Provisional application No. 62/464,304, filed on Feb. 27, 2017.

(51) Int. Cl.
*H04W 52/02* (2009.01)
*H04W 84/12* (2009.01)
*H04W 74/04* (2009.01)

(52) U.S. Cl.
CPC ... *H04W 52/0229* (2013.01); *H04W 52/0216* (2013.01); *H04W 52/0235* (2013.01);
(Continued)

(58) Field of Classification Search
CPC ......... H04W 52/0229; H04W 52/0235; H04W 52/0216; H04W 74/04; H04W 84/12; Y02D 70/142; Y02D 70/00
See application file for complete search history.

(56) References Cited

U.S. PATENT DOCUMENTS

| 8,199,686 B1* | 6/2012 | Donovan | H04W 52/0212 370/311 |
| 2014/0050133 A1* | 2/2014 | Jafarian | H04W 74/085 370/311 |

(Continued)

FOREIGN PATENT DOCUMENTS

WO    2015077569 A1    5/2015

OTHER PUBLICATIONS

International Search Report and Written Opinion—PCT/US2018/020002—ISA/EPO—dated May 15, 2018.
(Continued)

*Primary Examiner* — Kiet Tang
(74) *Attorney, Agent, or Firm* — Arent Fox, LLP and Qualcomm, Incorporated

(57) ABSTRACT

A method and an apparatus for wireless communication are provided. In one configuration, an apparatus is configured to transmit a wake-up radio (WUR) signal, to determine to transmit a second signal within a SIFS after transmitting the WUR signal to increase medium reuse, and to transmit the second signal within the SIFS after transmitting the WUR signal based on the determination. The second signal may be a data, management, control, ACK, or CF-end frame to enable legacy devices that do not decode the WUR signal to avoid wasted airtime cause by EIFS after the WUR signal. In another configuration, the apparatus is configured to transmit a CTS-to-self frame, to determine to transmit a second signal within a SIFS after transmitting the CTS-to-self frame, and to transmit the second signal based on the determination. The second signal may be a WUR signal or an intermediate signal followed by a WUR signal.

30 Claims, 7 Drawing Sheets

(52) U.S. Cl.
CPC ............ *H04W 74/04* (2013.01); *H04W 84/12* (2013.01); *Y02D 30/70* (2020.08)

(56) References Cited

U.S. PATENT DOCUMENTS

| | | | |
|---|---|---|---|
| 2018/0020404 A1* | 1/2018 | Huang | H04W 52/0229 |
| 2018/0084501 A1* | 3/2018 | Mu | H04L 27/26 |
| 2018/0183905 A1* | 6/2018 | Azizi | H04L 27/2613 |

OTHER PUBLICATIONS

Yongho Seok (NEWRACOM): "Coexistence Mechanism for Wakeup Radio Signal Follow-up", IEEE Draft; 11-16-1506-01-0WUR-Coexistence-Mechanism-for-Wakeup-Radio-Signal-Follow-up, IEEE-SA Mentor, Piscataway, NJ USA, vol. 802.11 WUR, No. 1, Nov. 10, 2016 (Nov. 10, 2016), XP068110947, 10 pages, Retrieved from the Internet: URL:https://mentor.ieee.org/802.11/dcn/16/11-16-1506-01-0wur-coexistence-mechanism-for-wakeup-radio-sign . . . [retrieved on Nov. 10, 2016].

\* cited by examiner

US 10,813,049 B2

COEXISTENCE ENHANCEMENTS FOR WAKE-UP RADIO

CROSS-REFERENCE TO RELATED APPLICATION(S)

This application claims the priority benefit of U.S. Provisional Application Ser. No. 62/464,304, entitled "COEXISTENCE ENHANCEMENTS FOR WAKE-UP RADIO" and filed on Feb. 27, 2017, which is expressly incorporated by reference herein in its entirety.

BACKGROUND

Field

The present disclosure relates generally to communication systems, and more particularly, to coexistence enhancements for wake-up radio (WUR).

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer-readable media, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., an access point or another wireless device) for wireless communication. The apparatus may be configured to transmit a first signal that includes a WUR signal. The apparatus may be configured to determine whether to transmit a second signal within a short interframe space (SIFS) after transmitting the WUR signal to increase medium reuse. The apparatus may be configured to transmit the second signal within the SIFS after transmitting the WUR signal based on the determination.

Another aspect of this disclosure provides an apparatus (e.g., an access point or another wireless device) for wireless communication. The apparatus may be configured to transmit a clear-to-send-to-self frame (CTS-to-self frame). The apparatus may be configured to determine whether to transmit a second signal within a SIFS after transmitting the CTS-to-self frame to increase medium reuse. The apparatus may be configured to transmit the second signal within the SIFS after transmitting the CTS-to-self frame based on the determination.

DETAILED DESCRIPTION

Figure 1:
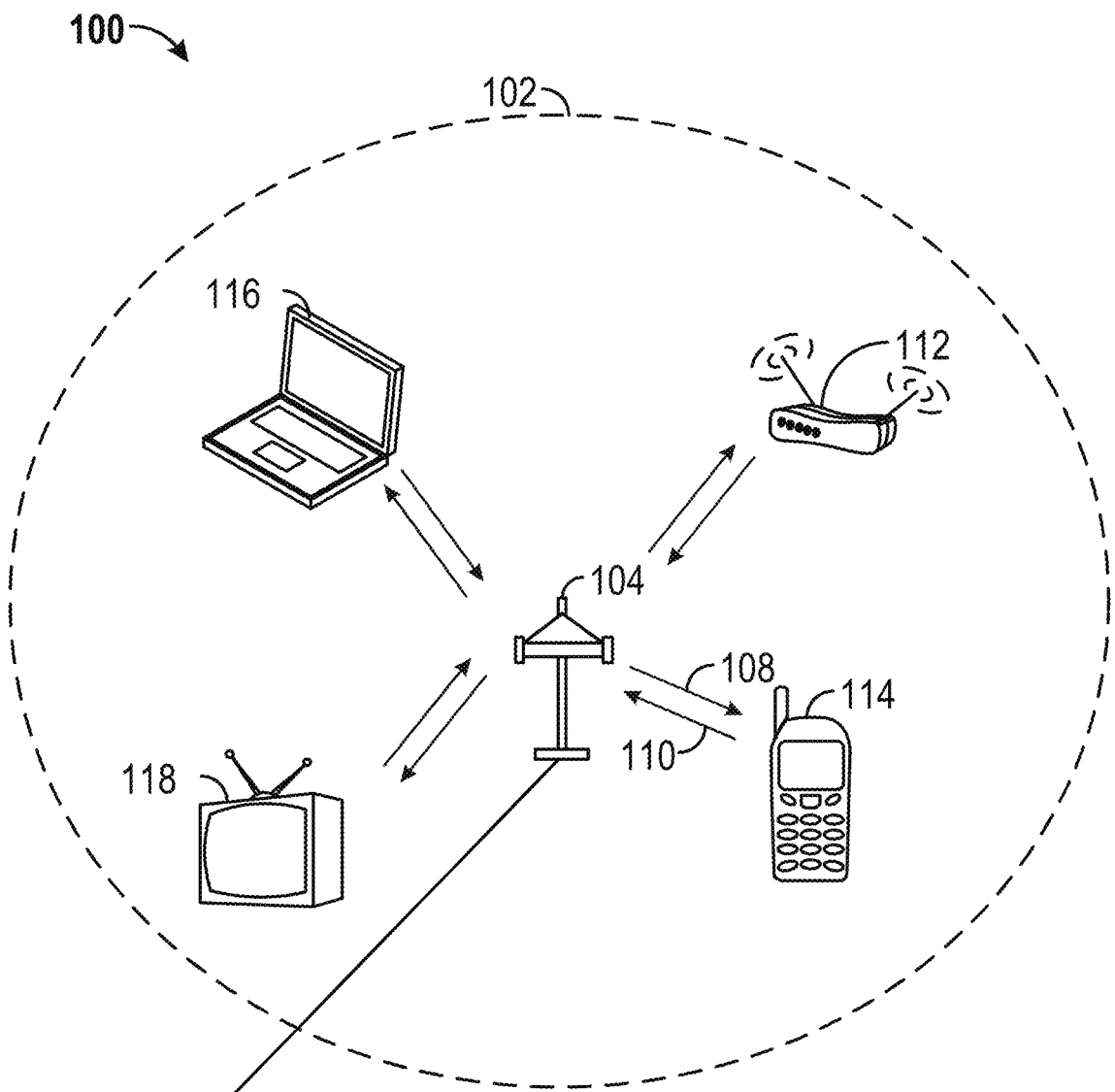
FIG. 1 shows an example wireless communication system in which aspects of the present disclosure may be employed.

Various aspects of the novel systems, apparatuses, computer-readable media, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer-readable media, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, such as the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include a WUR component 124 configured to perform procedures related to WUR and to enabling coexistence between WUR and other wireless communications, including 802.11 legacy STAs that do not recognize WUR transmissions. In one configuration, the WUR component 124 may be configured to transmit a first signal that includes a WUR signal. The WUR component 124 may be configured to determine to transmit a second signal within a SIFS after transmitting the WUR signal to increase medium reuse. The WUR component 124 may be configured to transmit the second signal within the SIFS after transmitting the WUR signal based on the determination. In another configuration, the WUR component 124 may be configured to transmit a CTS-to-self frame. The WUR component 124 may be configured to determine to transmit a second signal within a SIFS after transmitting the CTS-to-self frame to increase medium reuse. The WUR component 124 may be configured to transmit the second signal within the SIFS after transmitting the CTS-to-self frame based on the determination.

WUR is a power saving mechanism in wireless communications. A typical WLAN radio (e.g., a transceiver) in a wireless device (e.g., the STA 114) may consume a significant amount of power even when the wireless device is not transmitting or receiving data. For example, the wireless device may consume power to listen for traffic on the shared medium to determine if there are incoming data packets or to determine if the medium is free for the wireless device to transmit. One way to reduce power consumption is to allow the wireless device to enter into a sleep mode during which the main WLAN radio may be turned off. Although this technique reduces power consumption, the technique also increases communication latency. While in sleep mode, the wireless device may frequently and periodically monitor for incoming packets, but the monitoring may lead to greater power drain. On the other hand, if the wireless device infrequently monitors for incoming packets, then latency increases. As an alternative, a WUR may be a dedicated and separate radio (e.g., a secondary radio) from the main wireless radio or subcomponent of the main wireless radio (e.g., share one or more components with the main wireless radio) that is used to activate the main wireless radio. In one aspect, the WUR may share the radio frequency (RF) frontend with the main wireless radio. The WUR may have relatively simple design and, as a result, may consume much less power than a conventional wireless radio. For example, a typical wireless radio may consume 20 mA, whereas a WUR may consume less than 1 mA. The function of the WUR is to receive a paging signal (e.g., a WUR signal) dedicated for the wireless device, indicating that data is available for the wireless device. When the WUR receives the paging signal for the wireless device, then the WUR may instruct the wireless device to wake up the main wireless radio to receive data. To keep the design of the WUR simple, the paging signal may be modulated using a simpler modulation scheme, such as on-off keying (OOK), which refers to a simple form of amplitude-shift keying (ASK). In an aspect, the WUR may be always on or may be duty cycled (e.g., 1 ms intervals).

The WUR or paging signal may be transmitted in the same frequency band as other WLAN signals. As such, a need exists to protect WUR signals from interference by other transmissions (e.g., transmissions from legacy devices that cannot recognize WUR signals). If the WUR signals are interfered with or collide with other transmissions, then the targeted wireless device may not wake up, which would lead to packet delay and increased latency.

Protection/coexistence mechanisms may be used to protect the WUR signals from interference. A first approach is to protect WUR signals using length information in a preamble that is pre-appended to a WUR signal. A second approach is to protect the WUR signals using a network allocation vector (NAV) field of a clear-to-send-to-self frame (CTS-to-self). As further discussed below, however, each of the mechanisms includes some drawbacks, and therefore, improvements to the mechanisms are also proposed.

Figure 2:
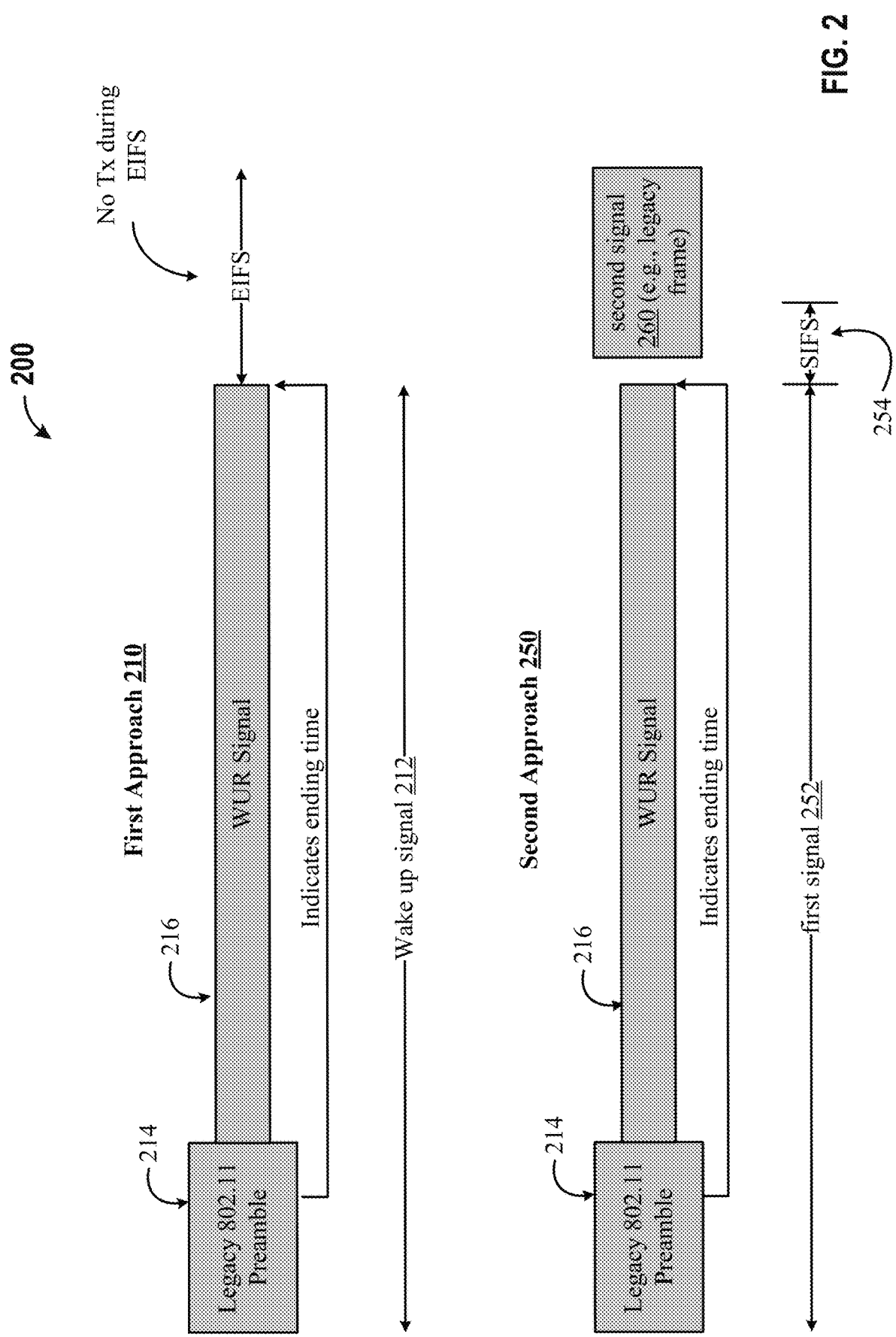
FIG. 2 is a diagram of two approaches for protection/coexistence mechanisms in accordance with the techniques described herein.

FIG. 2 is a diagram 200 of two approaches for protection/coexistence mechanisms. In a first approach 210, a first wireless device, such as the AP 104, may transmit a wake up signal 212 (e.g., a wake up signal frame) that includes a legacy preamble 214 (e.g., IEEE 802.11a preamble) and a WUR signal 216 to a second wireless device, such as the STA 114. The legacy preamble 214 may include a number of fields such as a legacy short training field (L-STF) for packet detection and automatic gain control (AGC) settings, a legacy long training field (L-LTF) for frequency offset, channel estimation, and timing information, and a legacy signal (L-SIG) field that indicates a data transmission rate (e.g., modulation and coding scheme (MCS), a number of bits to be transmitted, and/or a length or duration of the wake up signal 212 between the L-SIG field and the end of the wake up signal 212). The second wireless device, for which the WUR signal 216 was intended, may wake up after receiving the WUR signal 216. In an aspect, the WUR signal 216 may include a paging identifier identifying the second wireless device and indicating that data is available for the second wireless device. The WUR signal 216 may include a preamble (separate from the legacy preamble 214 shown in FIG. 2) and a payload. The preamble may include one or more STFs, an LTF, and a SIG field. The payload may include the page identifier identifying the wireless device to be woken up. Other wireless devices, for which the WUR signal 216 was not intended, may not transmit for the remaining duration of the wake up signal 212 based on the length or duration indicated in the L-SIG field of the wake up signal 212. Because other wireless devices may not transmit during the duration of the wake up signal 212, the mechanism offers protection and enables coexistence for the WUR signal 216, which may be referred to as PHY layer protection.

In some instances, however, there may be legacy wireless devices that are unable to decode the WUR signal 216. For example, there may be WUR incapable wireless devices (e.g., STAs), such as wireless devices that do not have a WUR. WUR incapable wireless devices may decode the legacy preamble 214 to know the end of the wake up signal 212, but are unable to decode the WUR signal 216. In some instances, there may be WUR capable wireless devices that fail to decode the WUR signal 216 due to weak signal strength or other channel impairment. WUR incapable wireless devices that are unable to decode, or WUR capable wireless devices that fail to decode, the WUR signal 216 at the ending time indicated by the legacy preamble 214 may have to refrain from transmitting for at least an extended interframe space (EIFS), which leads to wasted channel resources or airtime.

To reduce the likelihood of wasting channel resources, a second approach 250 is provided. Referring to FIG. 2, under the second approach 250, a first signal 252 is transmitted. Like the wake up signal 212, the first signal 252 includes a legacy preamble 214 and the 216 WUR signal. Similar to the first approach 210, the first wireless device may transmit the first signal 252. Subsequently, the first wireless device may append or transmit a second signal 260 that is decodable or is a legitimate legacy 802.11 transmission after transmitting the WUR signal 216. That is, the first wireless device may transmit the second signal 260 within a SIFS 254 after transmitting the WUR signal 216. By transmitting the second signal 260 within the SIFS 254 delay after transmitting the WUR signal 216, the first wireless device may not need to contend for the medium again. In an aspect, the second signal 260 may be a legacy frame that is decodable by a legacy device. For example, the second signal 260 may be an acknowledgment (ACK) frame (with destination to itself), a contention-free end (CF-end) frame, a data frame, management frame, control frame, or any other legacy frame. When legacy devices receive the second signal 260, the legacy devices will be able to decode the frame, and therefore, may not need to wait for EIFS before transmitting. Once the legacy frame is transmitted and successfully decoded by the legacy devices, the EIFS rule will be overridden, and the legacy devices may transmit after decoding the legacy frame. In one aspect, the data, management, control, or other valid-data frames transmitted after the WUR signal 216 may be received by WUR capable devices as well as by legacy devices.

In an aspect, ACK and CF-end frames may have a shorter duration than EIFS. As such, ACK and CF-end frames may be preferred with respect to reducing delay after the end of the WUR signal 216 at legacy devices because ACK and CF-end frames do not contain data, and the legacy devices may wait for a shorter duration than the EIFS before transmitting. For example, a legacy STA may receive the ACK frame to terminate the EIFS delay. In one aspect, a legacy STA may receive the CF-end frame as indicating the end of a contention-free period so that the legacy STA may contend for the channel resources without waiting for the end of the EIFS. ACK and CF-end frames may be referred to as non-valid-data frames and may include other types of frames that do not contain valid data. By contrast, data, management, control frames, and other frames containing valid data may be shorter or longer than the EIFS duration. But even when such frames are longer than the EIFS duration, the medium or air time is not wasted because information is being transmitted by the first wireless device. In one aspect, the first wireless device may determine if there are any legacy STAs nearby, e.g., WUR incapable STAs. If there are legacy STAs nearby, the first wireless device may determine if there are any data, management, control, or other valid-data frames waiting to be transmitted. If there are data, management, control, or other valid-data frames to be transmitted, the first wireless device may transmit the data, management, control, or other valid-data frames within the SIFS 254 following the end of the WUR signal 216 to avoid the wasted airtime caused by EIFS. Otherwise, the first wireless device may transmit the ACK or CF-end frames within the SIFS 254 following the end of the WUR signal 216 to terminate the EIFS prematurely. In another aspect, the first wireless device may transmit one or more non-valid-data frames (e.g., ACK or CF-end frames) within the SIFS 254 without first determining if, or regardless of whether, there are any data, management, control, or other valid-data frames available for transmission due to the shorter duration of the non-valid-data frames or due to regulatory constraints.

Figure 3:
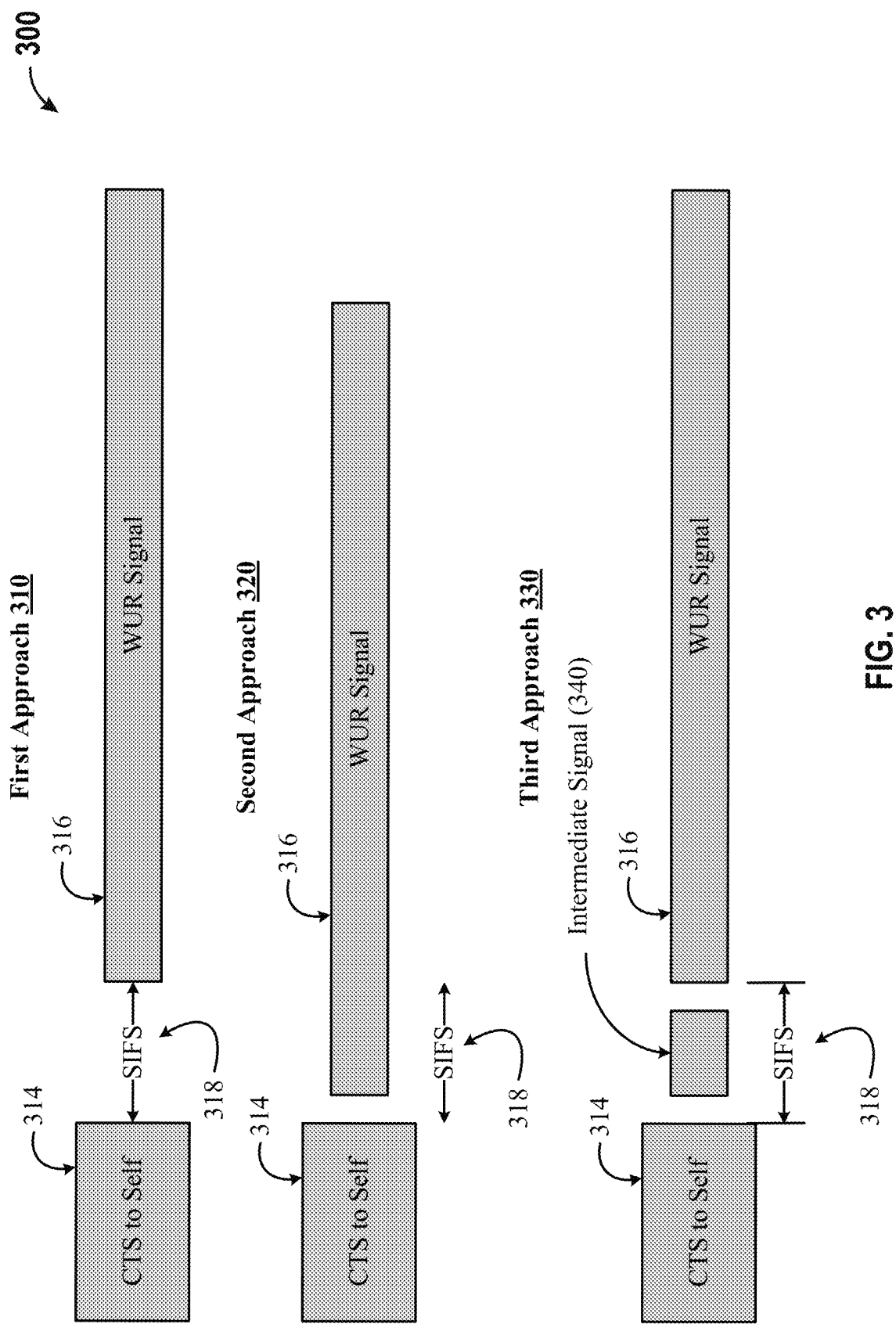
FIG. 3 is a diagram of three approaches for protection/coexistence mechanisms using CTS-to-self frames in accordance with the techniques described herein.

FIG. 3 is a diagram 300 of three approaches for protection/coexistence mechanisms using CTS-to-self frames. Referring to a first approach 310, a first wireless device (e.g., the AP 104) may send a CTS-to-self frame 314 and a WUR signal 316 following a SIFS 318 delay after transmitting the CTS-to-self frame 314. The CTS-to-self frame 314 may include a duration (e.g., a NAV field) indicating when the WUR signal 316 ends. Wireless devices that receive the CTS-to-self frame 314 may update their respective NAVs and may determine not to transmit for at least the duration that includes the WUR signal 316. As such, protection and coexistence for the WUR signal 316 is provided based on the duration indicated in the CTS-to-self frame 314. Such protection may be referred to as MAC layer protection. In some instances, however, the CTS-to-self frame 314 may be transmitted using a different bandwidth and/or transmit power than those of the WUR signal 316. For example, the CTS-to-self frame 314 may have a wider bandwidth and a greater transmit power than the WUR signal 316. Due to the differences in transmission characteristics, if the CTS-to-self frame 314 and the WUR signal 316 are sent on a dynamic frequency selection (DFS) channel (e.g., a channel that may include radar signals), certain devices may falsely detect the WUR signal 316 as radar signals. For example, STAs (e.g., WUR capable STAs or WUR incapable STAs) may falsely detect that radar signals are present during the SIFS 318 between the CTS-to-self frame 314 and the WUR signal 316 due to the change in the signal bandwidth and/or the transmit power when receiving the CTS-to-self frame 314 followed by the WUR signal 316. When such devices detect radar signals on a channel, the devices may be required to refrain from attempting to transmit on the channel for a predetermined period of time (e.g., 30 mins). As such, false positives for radar detection may significantly increase latency and needlessly reduce channel availability. To reduce the incidence of false positives, two alternative approaches are presented.

In a second approach 320, instead of waiting a SIFS 318 delay to transmit the WUR signal 316, the first wireless device may transmit the CTS-to-self frame 314 and then transmit the WUR signal 316 within a SIFS 318 delay. By reducing the gap between the CTS-to-self frame 314 and the WUR signal 316, incidence of false positives may be reduced or avoided because receiving devices are less likely to view the WUR signal 316 as a separate radar signal.

In a third approach 330, the first wireless device may transmit an intermediate signal 340 after transmitting the CTS-to-self frame 314 but before transmitting the WUR signal 316. The intermediate signal 340 may be transmitted within a SIFS 318 delay of the end of the transmission of the CTS-to-self frame 314. In an aspect, the intermediate signal 340 may be pure energy or may be specially coded such that the intermediate signal 340 may improve the acquisition of the WUR signal 316. For example, the intermediate signal 340 may be designed based on the preamble format of the WUR signal 316 so that the intermediate signal 340 may help AGC calibration or sensitivity control of the wireless devices receiving the WUR signal 316 to acquire the WUR signal 316. In one aspect, the intermediate signal 340 may be modulated using a simple modulation scheme such as the OOK used to modulate the WUR signal 316. In one aspect, the intermediate signal 340 may include information for the payload of the WUR signal 316. After transmitting the intermediate signal 340, the first wireless device may transmit the WUR signal 316 after a SIFS 318 delay. By transmitting an intermediate signal 340 in between the CTS-to-self frame 314 and the WUR signal 316, false positives for radar detection may be avoided or reduced.

Figure 4:
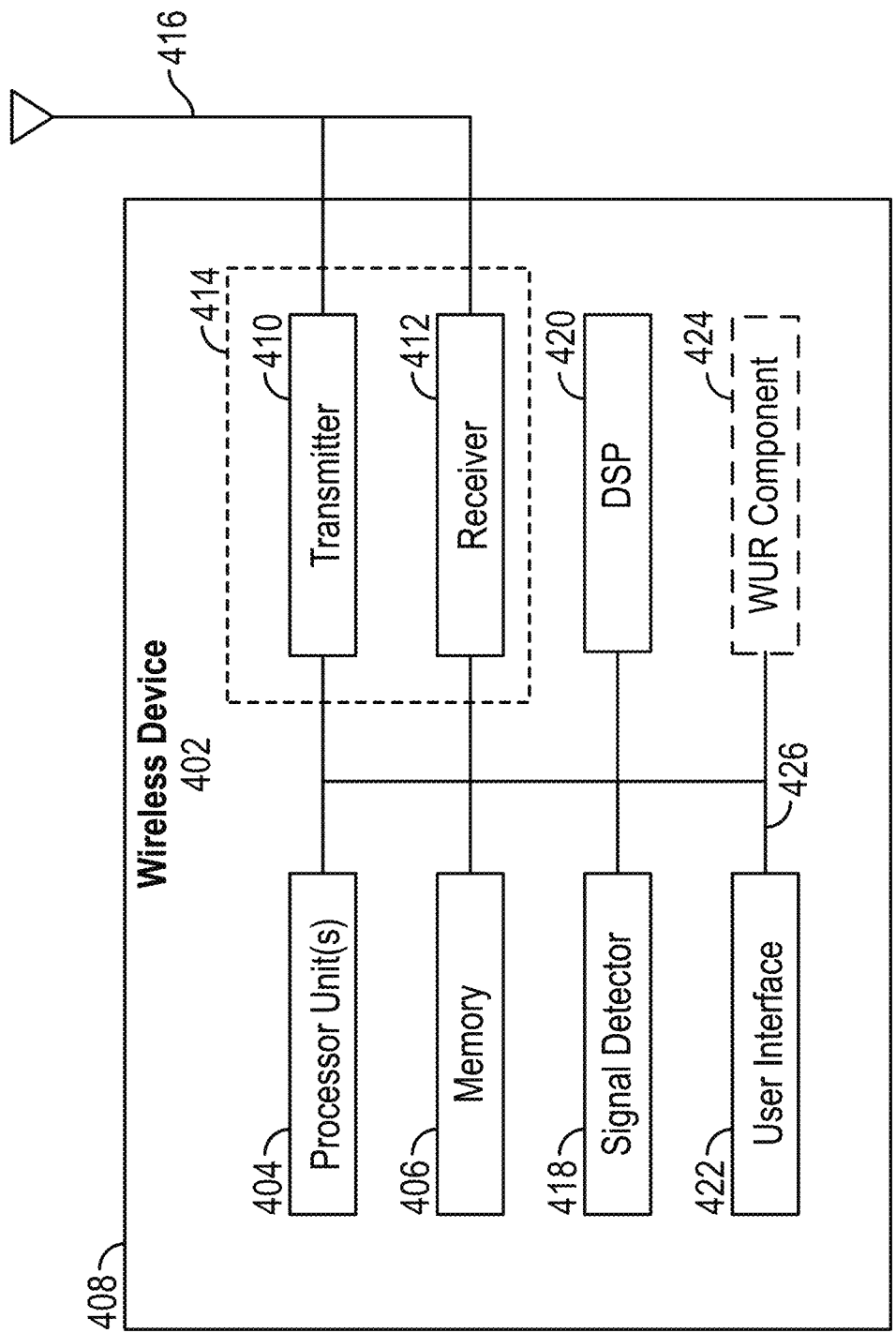
FIG. 4 shows an example functional block diagram of a wireless device that enables WUR protection and coexistence within the wireless communication system of FIG. 1.

FIG. 4 shows an example functional block diagram of a wireless device 402 that enables WUR protection and coexistence within the wireless communication system 100 of FIG. 1. The wireless device 402 is an example of a device that may be configured to implement the various methods described herein. For example, the wireless device 402 may comprise an AP (e.g., the AP 104).

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable (by the processor 404, for example) to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408, and the wireless device 402 may include a transmitter 410 and/or a receiver 412 to allow transmission and reception of data between the wireless device 402 and a remote device. The transmitter 410 and the receiver 412 may be combined into a transceiver 414. An antenna 416 may be attached to the housing 408 and electrically coupled to the transceiver 414. The wireless device 402 may also include multiple transmitters, multiple receivers, multiple transceivers, and/or multiple antennas.

The wireless device 402 may also include a signal detector 418 that may be used to detect and quantify the level of signals received by the transceiver 414 or the receiver 412. The signal detector 418 may detect such signals as total energy, energy per subcarrier per symbol, power spectral density, and other signals. The wireless device 402 may also include a DSP 420 for use in processing signals. The DSP 420 may be configured to generate a packet for transmission. In some aspects, the packet may comprise a physical layer convergence procedure (PLCP) protocol data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

When the wireless device 402 is implemented as an AP (e.g., the AP 104), the wireless device 402 may also comprise a WUR component 424. The WUR component 424 may be configured to perform one or more functions described herein. For example, the WUR component 424 may be configured to append or transmit a signal (e.g., second signal 260 of FIG. 2) that is decodable or is a valid legacy 802.11 transmission within a SIFS after transmitting the WUR signal to increase medium reuse. In an aspect, the signal may be a legacy frame that is decodable by a legacy device, such as an ACK frame (with destination to itself), a CF-end frame, a data frame, management frame, control frame, or any other legacy frame. The WUR component 424 may be configured to determine if there are any legacy STAs nearby, e.g., WUR incapable STAs. If there are legacy STAs nearby, the WUR component 424 may be configured to determine if there are any data, management, control, or other valid-data frames waiting to be transmitted. If there are, the WUR component 424 may be configured to append the data, management, control, or other valid-data frames within the SIFS following the end of the WUR signal for transmission by the transmitter 410 and the antenna 416. Otherwise, the WUR component 424 may be configured to append the ACK, CF-end frames, or other non-valid-data frames within the SIFS following the end of the WUR signal for transmission by the transmitter 410 and the antenna 416. In one aspect, the data, management, control, or other valid-data frames appended after the WUR signal may be received by WUR capable STAs.

In one aspect, the WUR component 424 may be configured to cause the wireless device 402 to transmit the CTS-to-self frame and the WUR signal within a SIFS delay to reduce the gap between the CTS-to-self frame and the WUR signal. In one aspect, the WUR component 424 may be configured to append an intermediate signal within a SIFS delay between the CTS-to-self frame and the WUR signal. In an aspect, the intermediate signal may be pure energy or may be specially coded such that the intermediate signal may improve the acquisition of the WUR signal. The WUR component 424 may be configured to generate the intermediate signal based on the preamble format of the WUR signal so that the intermediate signal may help AGC calibration or sensitivity control for purposes of acquisition of the WUR signal by WUR capable STAs.

The various components of the wireless device 402 may be coupled together by a bus system 426. The bus system 426 may include a data bus, for example, as well as a power bus, a control signal bus, and a status signal bus in addition to the data bus. Components of the wireless device 402 may be coupled together or accept or provide inputs to each other using some other mechanism.

Although a number of separate components are illustrated in FIG. 4, one or more of the components may be combined or commonly implemented. For example, the processor 404 may be used to implement not only the functionality described above with respect to the processor 404, but also to implement the functionality described above with respect to the signal detector 418, the DSP 420, the user interface 422, and/or the WUR component 424. Further, each of the components illustrated in FIG. 4 may be implemented using a plurality of separate elements.

Figure 5:
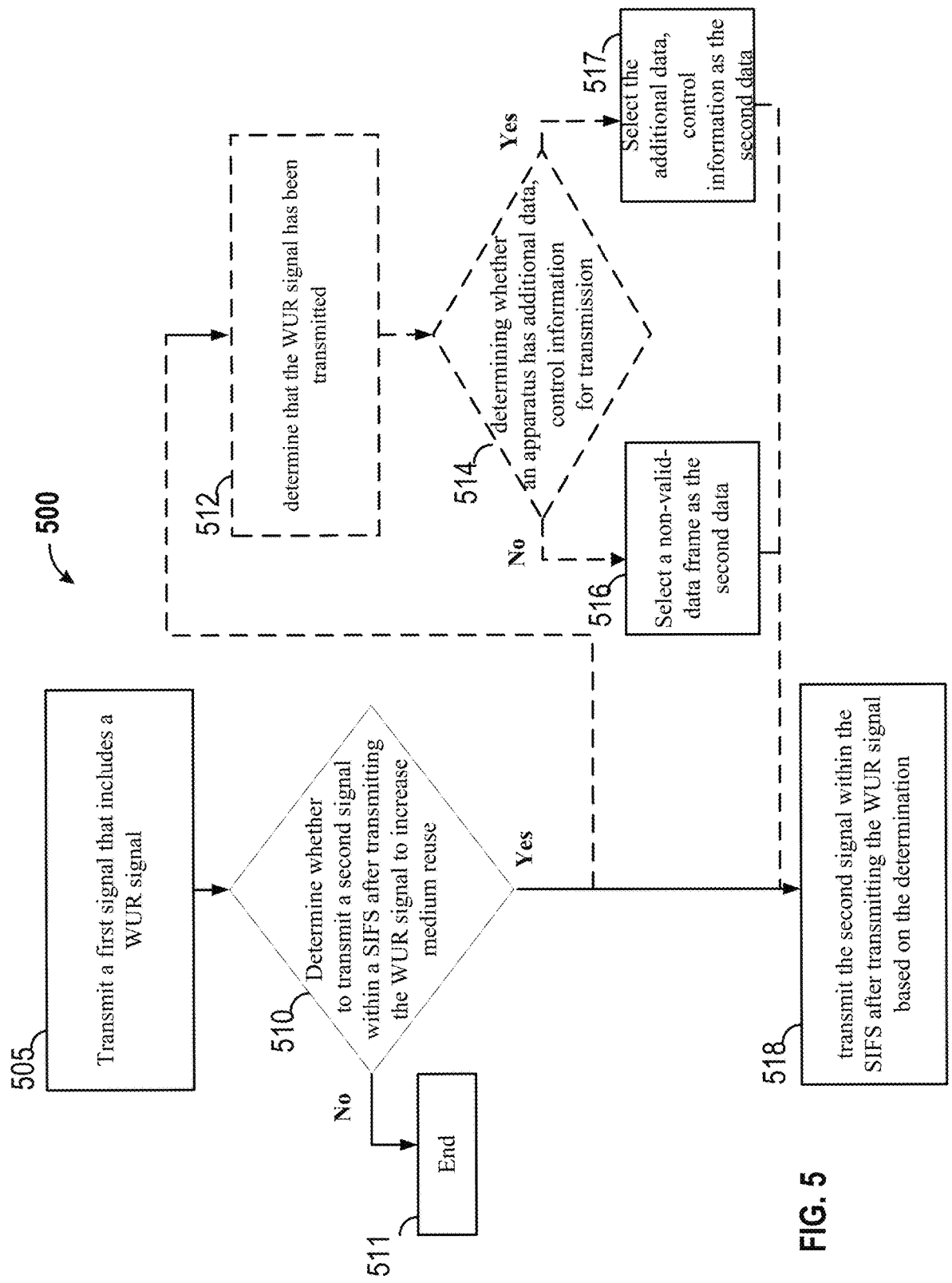
FIG. 5 is a flowchart of a first exemplary method of WUR protection and coexistence in accordance with the techniques described herein.

FIG. 5 is a flowchart of a first exemplary method 500 of WUR protection and coexistence. The method 500 may be performed using an apparatus (e.g., the AP 104, or the wireless device 402, for example). Although the method 500 is described below with respect to the elements of wireless device 402 of FIG. 4, other components may be used to implement one or more of the steps described herein. The dotted lines in FIG. 5 may indicate optional operations.

At block 505, the apparatus may transmit a first signal that includes a WUR signal. The WUR signal may include a preamble and a payload. The preamble may include one or more STFs, an LTF, and a SIG field. The payload may include the page identifier identifying a wireless device to be woken up.

At block 510, the apparatus may determine whether to transmit a second signal within a SIFS after transmitting the WUR signal to increase medium reuse. If the apparatus determines not to transmit a second signal within the SIF after transmitting the WUR signal, the apparatus does not transmit the second signal at block 511. Otherwise, in one configuration, the apparatus may determine to transmit the second signal by determining that the WUR signal has been transmitted (at 512) and by determining whether the apparatus has additional data or control information for transmission (at 514). The additional data or control information may be a legacy frame that is decodable by a legacy device, such as a data frame, management frame, control frame, or other valid-data frames. The apparatus may determine if there are any legacy STAs nearby. In block 517, if there are legacy STAs nearby and if there are additional data or control information for transmission, the apparatus may determine to transmit a data frame, a management frame, a control frame, or a valid-data frame, as the second signal. In block 516, if there are legacy STAs nearby and if the apparatus does not have additional data or control information for transmission, then the apparatus may determine to transmit an ACK frame (with destination to itself), a CF-end frame, or other legacy non-valid-data frames that are decodable by a legacy device as the second signal.

At block 518, the apparatus may transmit the second signal within the SIFs after transmitting the WUR signal based on the determination. A legacy device that receives a data frame, a management frame, or a control frame as the second signal may use the data, thus utilizing the airtime that otherwise would be wasted during the EIFS following the WUR signal. A legacy device that receives an ACK frame (with destination to itself), a CF-end frame, or other legacy non-data frames may use the frame to terminate the EIFS early to eliminate wasted airtime, thus increasing medium reuse.

Figure 6:
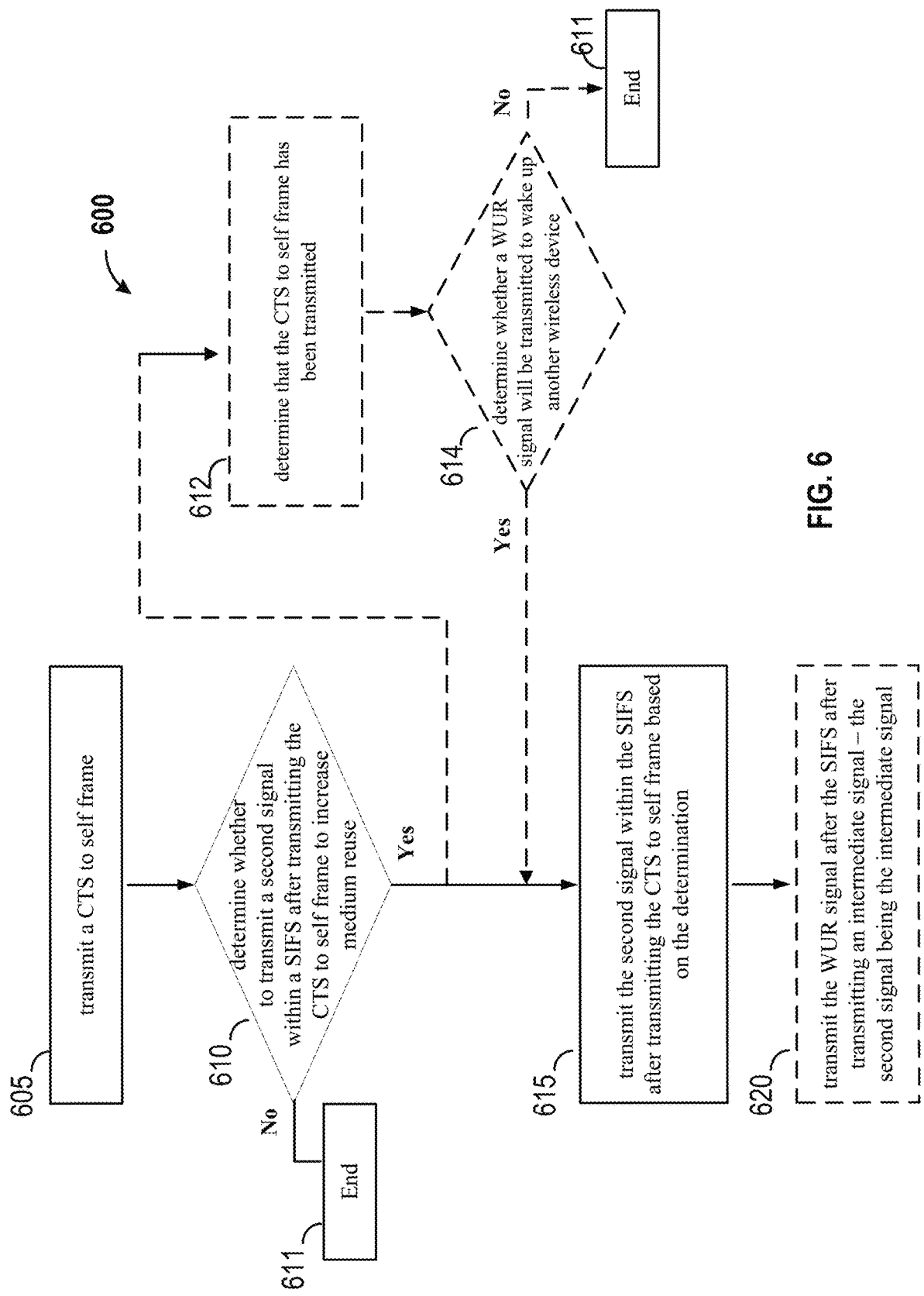
FIG. 6 is a flowchart of a second exemplary method of WUR protection and coexistence in accordance with the techniques described herein.

FIG. 6 is a flowchart of a second exemplary method 600 of WUR protection and coexistence. The method 600 may be performed using an apparatus (e.g., the AP 104, or the wireless device 402, for example). Although the method 600 is described below with respect to the elements of wireless device 402 of FIG. 4, other components may be used to implement one or more of the steps described herein. The dotted lines in FIG. 6 may indicate optional operations.

At block 605, the apparatus may transmit a CTS-to-self frame. The CTS-to-self frame may include a duration (e.g., a NAV field) indicating when the WUR signal ends.

At block 610, the apparatus may determine whether to transmit a second signal within a SIFS after transmitting the CTS-to-self frame to increase medium reuse. If the apparatus determines not to transmit a second signal within a SIFS after transmitting the CTS-to-self frame, then then the apparatus may not transmit the second signal at 511. Otherwise, in one configuration, the apparatus may determine to transmit the second signal by determining that the CTS-to-self frame has been transmitted (at 612) and by determining whether a WUR signal will be transmitted to wake up another wireless device (at 614). In 611, if the WUR signal will not be transmitted, then the apparatus may not transmit the second signal. Otherwise, if the WUR signal will be transmitted, then the apparatus may transmit the second signal in block 615.

At block 615, the apparatus may transmit the WUR signal as the second signal within the SIFS after transmitting the CTS-to-self frame based on the determination instead of waiting for the end of the SIFS delay to transmit the WUR signal. By reducing the gap between the CTS-to-self frame and the WUR signal, incidence of false positives may be reduced or avoided because a receiving device may not view the WUR signal as a separate radar signal.

At block 620, the apparatus may transmit an intermediate signal as the second signal after transmitting the CTS-to-self frame but before transmitting the WUR signal. The intermediate signal may be transmitted within a SIFS delay of the end of the transmission of the CTS-to-self frame. In an aspect, the intermediate signal may be pure energy or may be specially coded such that the intermediate signal may improve the acquisition of the WUR signal. For example, the intermediate signal may be designed based on the preamble format of the WUR signal so that the intermediate signal may help AGC calibration or sensitivity control for purposes of acquiring the WUR signal by WUR capable STAs. The apparatus may transmit the WUR signal at the end of the SIFS delay after transmitting the intermediate signal.

Figure 7:
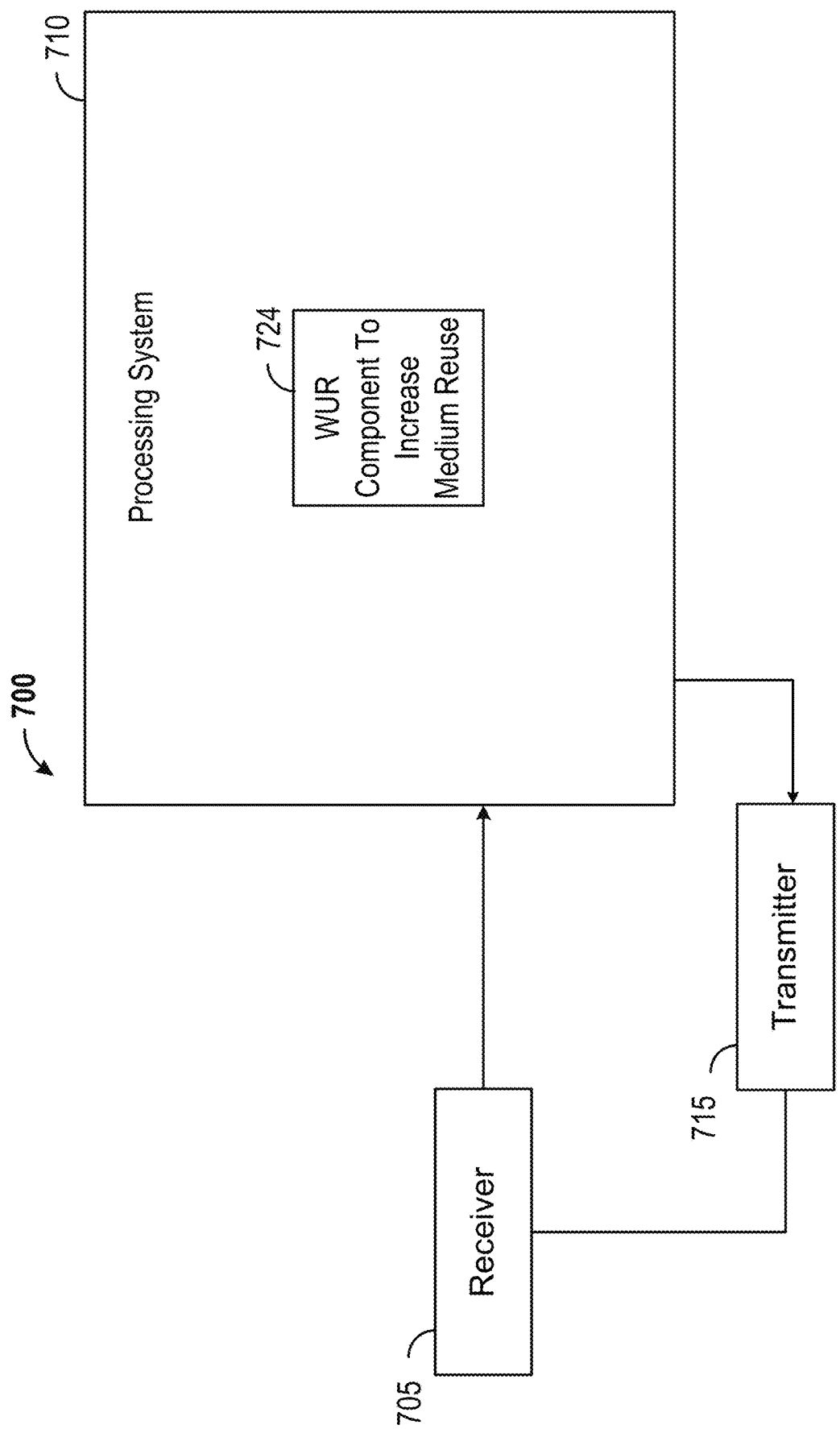
FIG. 7 is a functional block diagram of an example wireless communication device that may perform WUR protection and coexistence in accordance with the techniques described herein.

FIG. 7 is a functional block diagram of an example wireless communication device 700 that may perform WUR protection and coexistence. The wireless communication device 700 may include a receiver 705, a processing system 710, and a transmitter 715. The processing system 710 may include a WUR component 724. The processing system 710, the WUR component 724, and/or the transmitter 715 may be configured to perform one or more of the functions disclosed herein. For example, the WUR component 724 may be configured to append or transmit a signal (e.g., second signal 260 of FIG. 2) that is decodable or is a valid legacy 802.11 transmission within a SIFS after transmitting the WUR signal to increase medium reuse. In an aspect, the signal may be a legacy frame that is decodable by a legacy device, such as an ACK frame (with destination to itself), a CF-end frame, a data frame, management frame, control frame, or any other legacy frame. The WUR component 724 may be configured to determine if there are any legacy STAs nearby, e.g., WUR incapable STAs. If there are legacy STAs nearby, the WUR component 724 may be configured to determine if there are any data, management, control, or other valid-data frames waiting to be transmitted. If there are, the WUR component 724 may be configured to append the data, management, control, or other valid-data frames within the SIFS following the end of the WUR signal for transmission by the transmitter 715. Otherwise, the WUR component 724 may be configured to append the ACK, CF-end frames, or other non-valid-data frames within the SIFS following the end of the WUR signal for transmission by the transmitter 715. In one aspect, the data, management, control, or other valid-data frames appended after the WUR signal may be received by WUR capable STAs.

In one configuration, the WUR component 724 may be configured to transmit the CTS-to-self frame and the WUR signal within a SIFS delay to reduce the gap between the CTS-to-self frame and the WUR signal. In another configuration, the WUR component 724 may be configured to append an intermediate signal within a SIFS delay between the CTS-to-self frame and the WUR signal. In one aspect, the intermediate signal may be pure energy or may be specially coded such that the intermediate signal may improve the acquisition of the WUR signal. The WUR component 724 may be configured to generate the intermediate signal based on the preamble format of the WUR signal so that the intermediate signal may help AGC calibration or sensitivity control for purposes of acquisition of the WUR signal by WUR capable STAs.

The receiver 705, the processing system 710, the WUR component 724, and/or the transmitter 715 may be configured to perform one or more functions discussed above with respect to blocks 505, 510, and 515 of FIG. 5 and to blocks 605, 610, 615, and 620 of FIG. 6. The receiver 705 may correspond to the receiver 412. The processing system 710 may correspond to the processor 404. The transmitter 715 may correspond to the transmitter 410. The WUR component 724 may correspond to the WUR component 124 and/or the WUR component 424.

In one configuration, the wireless communication device 700 may include means for performing the functions described herein. For example, the wireless communication device 700 may include means for determining if there are any legacy STAs nearby, e.g., WUR incapable STAs. If there are legacy STAs nearby, the wireless communication device 700 may include means for determining if there are any data, management, control, or other valid-data frames waiting to be transmitted. If there are, the wireless communication device 700 may include means for appending the data, management, control, or other valid-data frames within the SIFS following the end of the WUR signal for transmission by the transmitter 715 to increase medium reuse. Otherwise, the wireless communication device 700 may include means for appending the ACK, CF-end frames, or other non-valid-data frames within the SIFS following the end of the WUR signal for transmission by the transmitter 715.

In one configuration, the wireless communication device 700 may include means for transmitting the CTS-to-self frame and the WUR signal within a SIFS delay to reduce the gap between the CTS-to-self frame and the WUR signal. In another configuration, the wireless communication device 700 may include means for appending an intermediate signal within a SIFS delay between the CTS-to-self frame and the WUR signal. In one aspect, the intermediate signal may be pure energy or may be specially coded such that the intermediate signal may improve the acquisition of the WUR signal. The wireless communication device 700 may include means for generating the intermediate signal based on the preamble format of the WUR signal so that the intermediate signal may help AGC calibration or sensitivity control for purposes of acquisition of the WUR signal by WUR capable STAs.

In one configuration, the means for determining the availability of, and for appending, any data, management, control, or other valid-data frames within the SIFS following the end of the WUR signal, the means for appending the ACK, CF-end frames, or other non-valid-data frames within the SIFS following the end of the WUR signal, the means for transmitting the CTS-to-self frame and the WUR signal within a SIFS delay to reduce the gap between the CTS-to-self frame and the WUR signal, and the means for appending an intermediate signal within a SIFS delay between the CTS-to-self frame and the WUR signal, may include the processing system 710, the WUR component 724, and/or the transmitter 715.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication of a first device associated with a wake-up radio (WUR), comprising:
   transmitting a first signal comprising a WUR signal;
   determining, based on a presence of a WUR incapable device, whether to transmit a second signal within a short interframe space (SIFS) after transmitting the WUR signal to increase medium reuse, the second signal being different than the first signal; and
   transmitting the second signal within the SIFS after transmitting the WUR signal in response to the determination to transmit the second signal within the SIFS.

2. The method of claim 1, wherein the second signal is one or more of an acknowledgment frame, a contention free end (CF-end) frame, a data frame, a management frame, or a control frame.

3. The method of claim 1, wherein determining whether to transmit a second signal further comprises determining that there are one or more devices that do not recognize the WUR signal.

4. The method of claim 3, wherein determining whether to transmit a second signal further comprises determining whether there is a valid-data frame available for transmission to the one or more devices in response to determining that there are one or more devices that do not recognize the WUR signal.

5. The method of claim 4, wherein the valid-data frame is one or more of a data frame, a management frame, or a control frame.

6. The method of claim 4, wherein determining whether to transmit a second signal further comprises determining that the second signal comprises the valid-data frame in response to determining there is a valid-data frame available for transmission to the one or more devices.

7. The method of claim 4, wherein determining whether to transmit a second signal further comprises determining that the second signal comprises a non-valid-data frame that does not contain valid data and that can be used to terminate early an extended interframe space (EIFS) at the one or more devices in response to determining there is not a valid-data frame available for transmission to the one or more devices.

8. The method of claim 7, wherein the non-valid-data frame that does not contain valid data is one or more of an acknowledgment frame or a contention free end (CF-end) frame.

9. A method of wireless communication of a first device associated with a wake-up radio (WUR), comprising:
transmitting a clear-to-send-to-self (CTS-to-self) frame on a channel capable of transmitting radar signals;
determining whether to transmit a second signal within a short interframe space (SIFS) after transmitting the CTS-to-self frame, the second signal being different than the CTS-to-self frame; and
transmitting the second signal within the SIFS after transmitting the CTS-to-self frame based on the determination to transmit the second signal within the SIFS, the second signal being transmitted on the channel capable of transmitting radar signals.

10. The method of claim 9, wherein the second signal is a WUR signal.

11. The method of claim 9, wherein the second signal reduces false detection of a radar signal by a second device that receives the CTS-to-self frame and the second signal.

12. The method of claim 9, wherein the second signal is an intermediate signal, and wherein the method further comprises:
transmitting a wake-up radio (WUR) signal after the SIFS after transmitting the intermediate signal.

13. The method of claim 12, wherein the intermediate signal aids a second device in acquiring the WUR signal.

14. The method of claim 12, wherein the intermediate signal is modulated using a modulation scheme used for the WUR signal.

15. An apparatus for wireless communications associated with a wake-up radio (WUR), comprising:
a memory; and
at least one processor coupled to the memory, wherein the at least one processor is configured to:
transmit a first signal comprising a WUR signal;
determine, based on a presence of a WUR incapable device, whether to transmit a second signal within a short interframe space (SIFS) after the transmission of the WUR signal to increase medium reuse, the second signal being different than the first signal; and
transmit the second signal within the SIFS after the transmission of the WUR signal based on the determination to transmit the second signal within the SIFS.

16. The apparatus of claim 15, wherein the second signal is one or more of an acknowledgment frame, a contention free end (CF-end) frame, a data frame, a management frame, or a control frame.

17. The apparatus of claim 15, wherein to determine whether to transmit a second signal, the at least one processor is further configured to determine that there are one or more devices that do not recognize the WUR signal.

18. The apparatus of claim 17, wherein in response to a determination that there are one or more devices that do not recognize the WUR signal, the at least one processor is further configured to determine whether there is a valid-data frame available for transmission to the one or more devices.

19. The apparatus of claim 18, wherein the valid-data frame is one or more of a data frame, a management frame, or a control frame.

20. The apparatus of claim 18, wherein to determine whether to transmit a second signal, the at least one processor is further configured to determine that the second signal comprises the valid-data frame in response to a determination that there is a valid-data frame available for transmission to the one or more devices.

21. The apparatus of claim 18, wherein in response to a determination that there is not a valid-data frame available for transmission to the one or more devices, the at least one processor is further configured to determine that the second signal comprises a non-valid-data frame that does not contain valid data and that can be used to terminate early an extended interframe space (EIFS) at the one or more devices.

22. The apparatus of claim 21, wherein the non-valid-data frame that does not contain valid data is one or more of an acknowledgment frame or a contention free end (CF-end) frame.

23. An apparatus for wireless communications associated with a wake-up radio (WUR), comprising:
means for transmitting a first signal comprising a WUR signal;
means for determining, based on a presence of a WUR incapable device, whether to transmit a second signal within a short interframe space (SIFS) after transmitting the WUR signal to increase medium reuse, the second signal being different than the first signal; and
means for transmitting the second signal within the SIFS after transmitting the WUR signal based on the determination to transmit the second signal within the SIFS.

24. The apparatus of claim 23, wherein the second signal is one or more of an acknowledgment frame, a contention free end (CF-end) frame, a data frame, a management frame, or a control frame.

25. The apparatus of claim 23, wherein the means for determining whether to transmit a second signal further comprises means for determining that there are one or more devices that do not recognize the WUR signal.

26. The apparatus of claim 25, wherein the means for determining whether to transmit a second signal further comprises means for determining whether there is a valid-data frame available for transmission to the one or more devices in response to determining that there are one or more devices that do not recognize the WUR signal.

27. The apparatus of claim 26, wherein the valid-data frame is one or more of a data frame, a management frame, or a control frame.

28. The apparatus of claim 26, wherein the means for determining whether to transmit a second signal further comprises means for determining that the second signal comprises the valid-data frame in response to determining that there is a valid-data frame available for transmission to the one or more devices.

29. The apparatus of claim 26, wherein the means for determining whether to transmit a second signal further comprises means for determining that the second signal comprises a non-valid-data frame that does not contain valid data and that can be used to terminate early an extended interframe space (EIFS) at the one or more devices in response to determining that there is not a valid-data frame available for transmission to the one or more devices.

30. The apparatus of claim 29, wherein the non-valid-data frame that does not contain valid data is one or more of an acknowledgment frame or a contention free end (CF-end) frame.

* * * * *